United States Patent
Matsumoto

(10) Patent No.: US 10,312,493 B2
(45) Date of Patent: Jun. 4, 2019

(54) BATTERY

(71) Applicant: TOYOTA JIDOSHA KABUSHIKI KAISHA, Toyota-shi, Aichi (JP)

(72) Inventor: Mizuho Matsumoto, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 15/700,762

(22) Filed: Sep. 11, 2017

(65) Prior Publication Data

US 2018/0072165 A1 Mar. 15, 2018

(30) Foreign Application Priority Data

Sep. 12, 2016 (JP) .................. 2016-178073

(51) Int. Cl.

| | | |
|---|---|---|
| *H01M 2/26* | (2006.01) | |
| *B60L 11/18* | (2006.01) | |
| *H01M 2/18* | (2006.01) | |
| *H01M 2/30* | (2006.01) | |
| *H01M 10/00* | (2006.01) | |
| *H01M 4/02* | (2006.01) | |

(52) U.S. Cl.
CPC ............. *H01M 2/263* (2013.01); *B60L 11/18* (2013.01); *H01M 2/18* (2013.01); *H01M 2/30* (2013.01); *H01M 10/00* (2013.01); *H01M 2004/021* (2013.01); *H01M 2220/20* (2013.01)

(58) Field of Classification Search
CPC .................................................. H01M 2/263
USPC ........................................................ 429/178
See application file for complete search history.

(56) References Cited

U.S. PATENT DOCUMENTS

| | | | |
|---|---|---|---|
| 2002/0094478 A1 | 7/2002 | Holland | |
| 2011/0217591 A1* | 9/2011 | Heo ....................... | H01M 2/204 |
| | | | 429/211 |
| 2012/0070720 A1* | 3/2012 | Aizawa .................. | B23K 20/10 |
| | | | 429/163 |
| 2016/0164133 A1 | 6/2016 | Matsumoto et al. | |
| 2016/0204411 A1* | 7/2016 | Lee ......................... | H01M 2/30 |
| | | | 429/158 |

FOREIGN PATENT DOCUMENTS

| | | |
|---|---|---|
| JP | H09213298 A | 8/1997 |
| JP | 2011187443 A | 9/2011 |
| JP | 2016-110892 A | 6/2016 |
| JP | 2016110949 A | 6/2016 |
| KR | 10-2011-0100583 A | 9/2011 |

* cited by examiner

*Primary Examiner* — James M Erwin
(74) *Attorney, Agent, or Firm* — Sughrue Mion, PLLC

(57) ABSTRACT

The battery according to the present invention includes electrodes provided with current collecting tabs 26 and 36, an electrode body 10 constituted by repeatedly laminating the electrodes in the direction of lamination, and tab groups 28 and 38 obtained by overlaying repeatedly laminated electrode tabs 26 in the direction of lamination. First tabs 26 and 36 included in the tab groups 28 and 38 have extending parts 26a and 36a which extend from an active material layer, and crossing parts 26b and 36b which extend in a direction perpendicular to, or intersecting at an acute angle with, the direction of extension A of the extending parts 26a and 36a. The crossing parts 26b and 36b are gathered together in the direction of lamination, and current collector terminals 70 and 72 are joined to the positions at which the crossing parts are gathered together.

4 Claims, 11 Drawing Sheets

BATTERY

CROSS-REFERENCE

The present application claims priority on the basis of Japanese Patent Application No. 2016-178073, which was filed on 12 Sep. 2016, and the entire contents of that application are incorporated by reference in the present specification.

BACKGROUND OF THE INVENTION

1. Field of the Invention

The present invention relates to a battery. More specifically, the present invention relates to a battery provided with an electrode body in which positive and negative electrodes are alternately laminated with a separator interposed therebetween.

2. Description of the Related Art

In recent years, batteries such as lithium ion secondary batteries and nickel metal hydride batteries have been advantageously used as vehicle-mounted power sources and power sources for personal computers and portable terminals. In particular, lithium ion secondary batteries are lightweight and can achieve high energy densities, and are therefore increasing in importance as, for example, vehicle-mounted high output power sources or power sources for power storage systems. As one type of such battery, a battery having a battery structure provided with an electrode body in which positive and negative electrodes are alternately laminated with a separator interposed therebetween is known.

For example, the battery 1 shown in FIG. 11 is provided with an electrode body 3, which is obtained by repeatedly and alternately laminating positive and negative electrodes, each of which is provided with an active material layer 2 and a current collecting tab 6 that extends from the active material layer 2, with a separator between the electrodes, and current collector terminals 4 and 5. The electrode body 3 has tab groups 7 and 8 in which same polarity tabs 6, which extend from the active material layers 2 of the repeatedly laminated positive and negative electrodes, are gathered together (bundled) in the direction of lamination of the electrode body 3. The current collector terminals 4 and 5 are attached to the tab groups 7 and 8 by means of welding or the like, and electrode terminals (not shown) are electrically connected to the electrode body 3 via the current collector terminals 4 and 5. Japanese Patent Application Publication No. 2016-110892 is given as an example of a technical document relating to this type of battery structure.

SUMMARY OF THE INVENTION

In the battery 1 constituted in the manner described above, when the tab groups 7 and 8 of the current collecting tabs 6 that extend from the active material layers 2 are gathered together in the direction of lamination of the electrode body 3, the electrodes may be pulled in the extension direction A of the tabs 6 as a result of tension (tensile force) applied to the tabs 6. In particular, tabs on the side that is further from the tab-gathering position (bundling position) are subjected to greater tension than tabs on the side that is nearer to the tab-gathering position. As a result, electrodes on the side that is further from the tab-gathering position protrude in the extension direction A of the tabs 6 to a greater extent than electrodes on the side that is nearer to the tab-gathering position, which leads to the possibility of electrodes becoming misaligned. In order to suppress this type of electrode misalignment, a method involving sufficiently increasing the length of the tabs in the direction of extension so as to alleviate this tension has been considered, but if the length of the tabs in the direction of extension is increased, spaces where the tabs are disposed become useless spaces that do not function as electrodes, which can lead to concerns regarding a decrease in the energy density of the battery.

The present invention has been devised with such circumstances in mind, and has the primary objective of providing a battery that can effectively suppress electrode misalignment when tabs are gathered together without the need to increase the length of the current collecting tabs in the direction of extension.

The battery provided by the present invention includes positive and negative electrodes, each of which is provided with an active material layer and a current collecting tab that extends from the active material layer, an electrode body constituted by repeatedly and alternately laminating the positive and negative electrodes in the direction of lamination with a separator interposed therebetween, tab groups obtained by overlaying, in the direction of lamination, same polarity tabs of the repeatedly laminated positive and negative electrodes, and current collector terminals connected to the tab groups. The tab groups include at least first tabs as the current collecting tabs. The first tabs each have, in a plane that is perpendicular to the direction of lamination, an extending part which extends from the active material layer, and a crossing part which extends from the extending part in a direction perpendicular to, or intersecting at an acute angle with, the direction of extension of the extending part. In addition, the crossing parts of the first tabs are gathered together in the direction of lamination, and the current collector terminals are joined to the positions at which the crossing parts are gathered together. According to this configuration, when the crossing parts of the first tabs that constitute a tab group are gathered together in the direction of lamination of the electrode body, tension (tensile force) applied to the first tabs is unlikely to act in the direction of extension (the direction in which a tab extends from an active material layer). As a result, when a tab group is gathered together and joined to a current collector terminal, the occurrence of positive and negative electrodes being pulled in the direction of extension and protruding is suppressed. By configuring in this way, it is possible to suppress electrode misalignment without the need to increase the length of the tabs in the direction of extension.

In a preferred aspect of the battery disclosed here, the tab groups further include, as the current collecting tabs, second tabs disposed on the center side in the direction of lamination. The second tabs each have, in a plane that is perpendicular to the direction of lamination, an extending part which extends from the active material layer in the direction of extension, the width of the extending part in a direction perpendicular to the direction of extension being greater than the width of the extending part of the first tab. In addition, the extending parts of the second tabs and the crossing parts of the first tabs are gathered together towards the center side in the direction of lamination, and the current collector terminals are joined to the positions at which the tabs are gathered together. By configuring in this way, it is possible to suppress electrode misalignment while suppressing tab group breakage even in cases where tab groups are subjected to external forces such as vibrations.

In a preferred aspect of the battery disclosed here, the tab groups further include, as the current collecting tabs, second tabs disposed on one side in the direction of lamination. The second tabs each have, in a plane that is perpendicular to the direction of lamination, an extending part which extends from the active material layer in the direction of extension, the width of the extending part in a direction perpendicular to the direction of extension being greater than the width of the extending part of the first tab. In addition, the extending parts of the second tabs and the crossing parts of the first tabs are gathered together towards one side in the direction of lamination, and the current collector terminals are joined to the positions at which the tabs are gathered together. By configuring in this way, it is possible to suppress electrode misalignment while suppressing tab group breakage even in cases where tab groups are subjected to external forces such as vibrations.

DETAILED DESCRIPTION OF THE INVENTION

Figure 1:
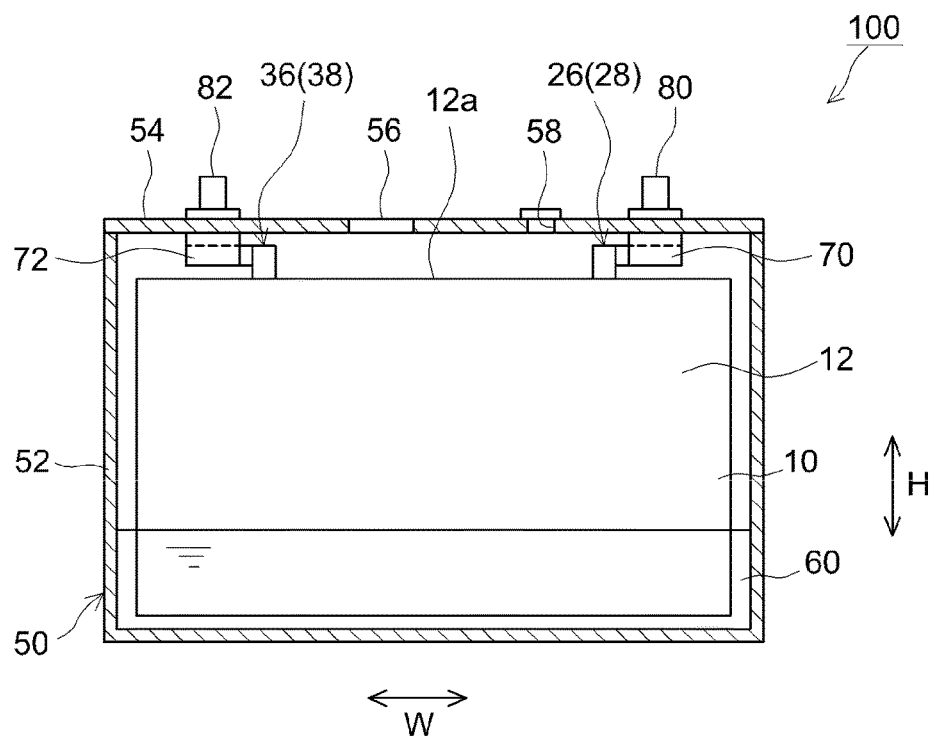
FIG. 1 is a cross sectional view that schematically illustrates a secondary battery according to one embodiment.

Embodiments according to the present invention will now be explained with reference to the drawings. Moreover, matters which are essential for carrying out the invention and which are matters other than those explicitly mentioned in this specification (for example, ordinary features and production processes of the electrode body that do not characterize the present invention) are matters that a person skilled in the art could understand to be matters of design on the basis of the prior art in this technical field. The present invention can be carried out on the basis of the matters disclosed in the present specification and common general technical knowledge in this technical field. In addition, members/parts that perform the same action are denoted by the same symbols in the drawings below. In addition, dimensional relationships (length, width, thickness and so on) in the drawings do not reflect actual dimensional relationships.

A case in which the present invention is used in a lithium ion secondary battery will now be explained, but this case is not intended to limit the scope of application of the present invention. Moreover, the term "secondary battery" in the present specification means electricity storage devices in general that can be repeatedly charged and discharged, and is a term that encompasses storage batteries, such as lithium ion secondary batteries and nickel metal hydride batteries, and electricity storage devices such as electrical double layer capacitors. In addition, the term "lithium ion secondary battery" in the present specification means a secondary battery in which lithium ions are used as charge carriers and charging and discharging are effected by means of charge transfer involving lithium ions between positive and negative electrodes.

First Embodiment

Figure 2:
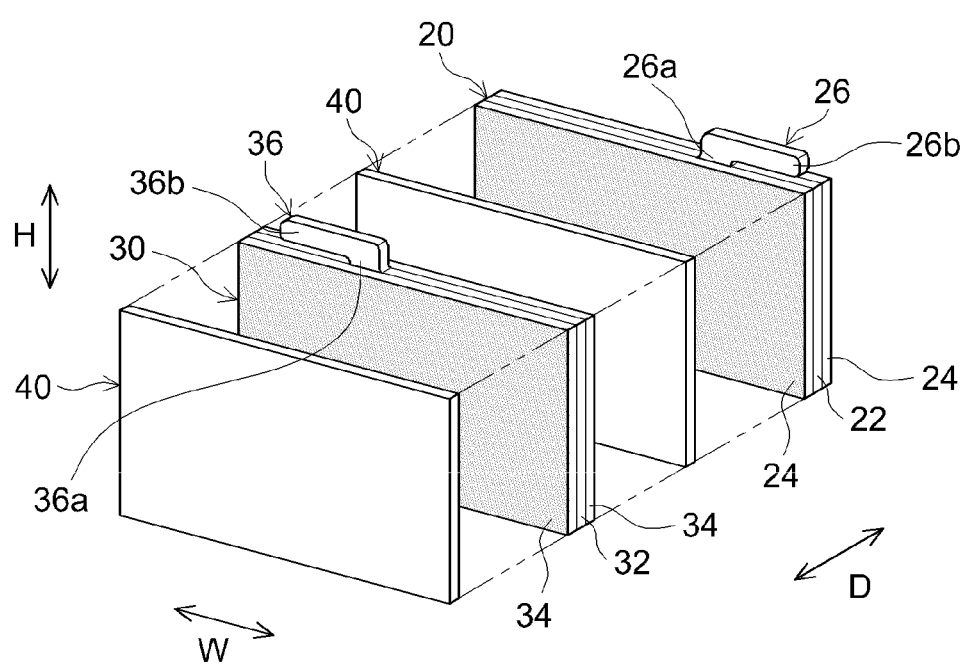
FIG. 2 is a diagram for explaining positive electrodes, negative electrodes and separators that constitute an electrode body according to one embodiment.

FIG. 1 is a schematic cross sectional view that illustrates the inside of a lithium ion secondary battery 100 according to one embodiment. FIG. 2 is a diagram for explaining positive electrodes 20, negative electrodes 30 and separators 40 that constitute an electrode body 10. Moreover, the symbol W in the diagrams indicates the width direction of the battery, the symbol D indicates the depth direction of the battery, and the symbol H indicates the height direction of the battery. However, these are merely directions used for the sake of convenience in explanations, and in no way limit the way in which the lithium ion secondary battery 100 is constructed.

As shown in FIG. 1 and FIG. 2, the lithium ion secondary battery 100 includes a battery case 50, an electrode body 10, an electrolyte 60 and current collector terminals 70 and 72.

The battery case 50 is a container that houses the electrode body 10, the electrolyte 60 and the current collector terminals 70 and 72. In the present embodiment, the battery case 50 has a bottomed square (cuboid) external shape. The battery case 50 includes a flat-bottomed case main body 52, the top of which is open, and a lid 54, which seals the open part of the case main body 52. The material of the battery case 50 is, for example, a metal material such as aluminum or steel.

A positive electrode terminal 80 and negative electrode terminal 82, which are used for external connections, protrude from the top surface of the battery case 50, that is, from the lid 54. The positive electrode terminal 80 is electrically connected to the positive electrode 20 of the electrode body 10. The negative electrode terminal 82 is electrically connected to the negative electrode 30 of the electrode body 10. A relief valve (a safety valve) 56 and an injection port 58 are provided in the lid 54. The relief valve 56 is formed so as to be thinner than other parts of the battery case 50. The relief valve 56 is used to release pressure inside the battery case 50. The injection port 58 is used to inject a liquid electrolyte (an electrolyte solution). The injection port 58 is fitted with a cap and hermetically sealed.

The inside of the battery case 50 houses the electrode body 10, the electrolyte 60 and the current collector terminals 70 and 72. In this case, the electrode body 10 is a lamination type electrode body (a laminated electrode body). The electrode body 10 includes a plurality of rectangular positive electrode sheets 20 and a plurality of rectangular negative electrode sheets 30. The positive electrode sheets 20 and negative electrode sheets 30 are overlaid in an insulated state with separators 40 interposed therebetween. In this case, the direction of lamination of the electrode body 10 is the thickness direction D.

Each positive electrode sheet 20 includes a positive electrode current collector 22 and a positive electrode active material layer 24, which is formed on a surface of the positive electrode current collector. For example, a metal foil suitable for a positive electrode can be advantageously used as the positive electrode current collector 22. In this embodiment, an aluminum foil is used as the positive electrode current collector 22. In the illustrated example, a positive electrode active material layer 24 is held on both surfaces of the positive electrode current collector 22. In addition, the positive electrode active material layer 24 is formed so as to have the same width as the overall width of the positive electrode current collector 22 in the width direction W.

The positive electrode active material layer 24 contains a positive electrode active material, an electrically conductive material and a binder. One or two or more types of substance used in the past in lithium ion secondary batteries can be used without limitation as the positive electrode active material. For example, it is possible to use a lithium-transition metal composite oxide having a layered structure and represented by the general formula $LiMeO_2$ (Me includes at least one type of transition metal element such as Ni, Co or Mn), such as $LiNi_{1/3}Co_{1/3}Mn_{1/3}O_2$ (a lithium-nickel-cobalt-manganese composite oxide), $LiNiO_2$ (a lithium-nickel composite oxide) or $LiCoO_2$ (a lithium-cobalt composite oxide). In addition to the positive electrode active material mentioned above, the positive electrode active material layer 24 may contain an electrically conductive material such as acetylene black (AB) and a binder such as poly(vinylidene fluoride) (PVDF) or a styrene-butadiene rubber (SBR).

The positive electrode sheet 20 has a projecting part 26, on which the positive electrode active material layer 24 is not formed and which projects further upwards than the part of the positive electrode sheet on which the positive electrode active material layer 24 is formed. Because the positive electrode active material layer 24 is not formed on this projecting part 26, the positive electrode current collector 22 is exposed. The current collecting tab 26 is formed from this projecting part 26. The current collecting tab 26 extends from the edge of the positive electrode active material layer 24.

Figure 3:
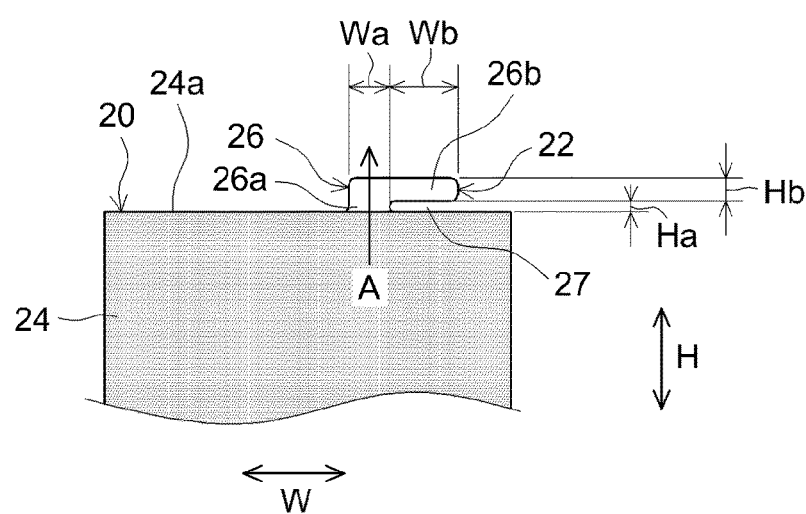
FIG. 3 is a frontal view that schematically illustrates the principal parts of a positive electrode sheet shown in FIG. 2.

FIG. 3 is a frontal view that schematically illustrates the principal parts of a positive electrode sheet 20 shown in FIG. 2. As shown in FIG. 3, the current collecting tab 26 has an extending part 26a and a crossing part 26b in a plane that is perpendicular to the direction of lamination of the electrode body 10. The extending part 26a is a part that extends from the positive electrode active material layer 24. In this embodiment, the extending part 26a extends towards the lid 54 (FIG. 1) along the height direction H from an edge 24a of the positive electrode active material layer 24. The crossing part 26b is a part that extends from the extending part 26a in a direction that is perpendicular (that is, a right angle) to the direction A in which the extending part 26a extends from the positive electrode active material layer 24 (the direction of extension). In this case, the direction that is perpendicular to the direction of extension A is the width direction W. In addition, the crossing part 26b is a part to which the positive electrode current collector terminal 70 (FIG. 1) is joined. In this embodiment, the width Wb of the crossing part 26b in the direction that is perpendicular to the direction of extension A (the width direction W in this case) can be approximately 5 mm or more, and preferably 10 mm or more, from the perspective of advantageously ensuring an area of contact with the positive electrode current collector terminal 70. In addition, in the direction that is perpendicular to the direction of extension A (the width direction W in this case), the width Wa of the extending part 26a in the width direction W can be approximately 10 mm or more, and preferably 20 mm or more, from perspectives such as the strength of the current collecting tab 26 and current collection performance.

In this embodiment, a notch 27 is formed between the crossing part 26b and the edge 24a of the positive electrode active material layer 24. The crossing part 26b and the positive electrode active material layer 24 are separated by this notch 27, and tension (tensile force) applied to the tabs 26 when crossing parts 26b are gathered together is unlikely to act in the direction of extension A of the tabs 26. The length Ha of the notch 27 in the direction of extension A (the height direction H in this case) is smaller than the length Hb of the crossing part 26b. From the perspective of increasing the occupancy of the electrode body in the battery case so as to increase the energy density of the battery, the length Ha of the notch 27 in the direction of extension A can be approximately 3 mm or less, and preferably 2 mm or less. The lower limit of the length Ha of the notch 27 is not particularly limited. For example, the length Ha of the notch 27 may be 0 mm, that is, an incision may be made in the positive electrode current collector 22 between the crossing part 26b and the positive electrode active material layer 24. From the perspective of advantageously ensuring an area of contact with the positive electrode current collector terminal 70, the length Hb of the crossing part 26b in the direction of extension A can be approximately 3 mm or more, and preferably 5 mm or more. The upper limit of the length Hb of the crossing part 26b is not particularly limited, but from the perspective of increasing the occupancy of the electrode body in the battery case so as to increase the energy density of the battery, the length Hb of the crossing part 26b can be approximately 15 mm or less, and preferably 10 mm or less.

As shown in FIG. 1 to FIG. 3, each negative electrode sheet 30 includes a negative electrode current collector 32 and a negative electrode active material layer 34, which is formed on a surface of the negative electrode current collector. For example, a metal foil suitable for a negative electrode can be advantageously used as the negative electrode current collector 32. In this embodiment, a copper foil is used as the negative electrode current collector 32. In the illustrated example, a negative electrode active material layer 34 is held on both surfaces of the negative electrode current collector 32. In addition, the negative electrode active material layer 34 is formed so as to have the same width as the overall width of the negative electrode current collector 32 in the width direction W.

The negative electrode active material layer 34 contains a negative electrode active material, a thickening agent, a binder, and the like. The negative electrode active material is not particularly limited, and can be one or two or more types of substance previously used in lithium ion secondary batteries. Examples thereof include carbonaceous materials such as graphite carbon and amorphous carbon, lithium-transition metal oxides and lithium-transition metal nitrides. In addition to these negative electrode active materials, it is possible to add a binder such as poly(vinylidene fluoride) (PVDF) or a styrene-butadiene rubber (SBR) and a thickening agent such as carboxymethyl cellulose (CMC).

The negative electrode sheet 30 has a projecting part 36, on which the negative electrode active material layer 34 is not formed and which projects further upwards than the part of the negative electrode sheet on which the negative electrode active material layer 34 is formed. Because the negative electrode active material layer 34 is not formed on this projecting part 36, the negative electrode current collector 32 is exposed. The current collecting tab 36 is formed from this projecting part 36. The negative electrode side current collecting tab 36 extends from an edge of the negative electrode active material layer 34. In addition, the negative electrode side current collecting tab 36 extends from the edge of the negative electrode active material layer 34 at a position that is different from that of the positive electrode side current collecting tab 26 in the width direction W. Like the positive electrode side current collecting tab 26, the negative electrode side current collecting tab 36 has an extending part 36a, which extends from the negative electrode active material layer 34, and a crossing part 36b, which extends from the extending part 36a in a direction that is perpendicular to the direction of extension A of the extending part 36a. The configuration of the negative electrode side current collecting tab 36, such as detailed dimensions, is similar to those for the positive electrode side current collecting tab 26, and duplicate explanations are therefore omitted.

The separator 40 is a component that separates the positive electrode sheet 20 from the negative electrode sheet 30. In this example, the separator 40 is constituted from a sheet material having a prescribed width and having a plurality of ultrafine holes. For example, a separator constituted from a porous polyolefin resin and having a single layer structure or multilayer structure can be used as the separator 40.

As mentioned above, the electrode body 10 is formed by laminating a plurality of positive electrode sheets 20, a plurality of negative electrode sheets 30 and a plurality of separators 40. Specifically, the electrode body 10 is formed by repeatedly and alternately laminating the positive electrode sheet 20 and the negative electrode sheet 30 in the direction of lamination (the thickness direction D in this case) with the separator 40 interposed therebetween. In addition, the electrode body 10 has a laminated part 12 in which the positive electrode active material layer 24 and the negative electrode active material layer 34 are overlaid with the separator 40 interposed therebetween. This laminated part 12 is a part where charge carriers (lithium ions in this case) are exchanged between the positive electrode active material layer 24 and the negative electrode active material layer 34 via the separator 40, and is a part that contributes to charging and discharging of the battery 100.

Figure 4:
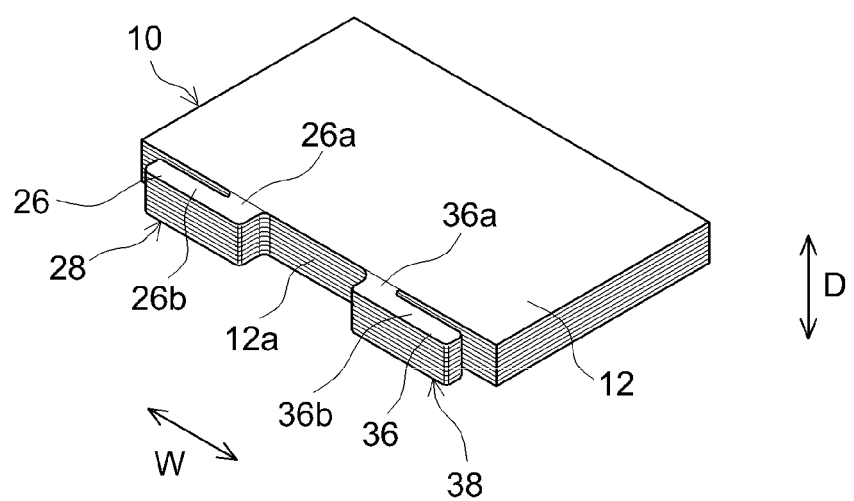
FIG. 4 is a perspective view that schematically illustrates an electrode body prior to joining current collector terminals.
Figure 5:
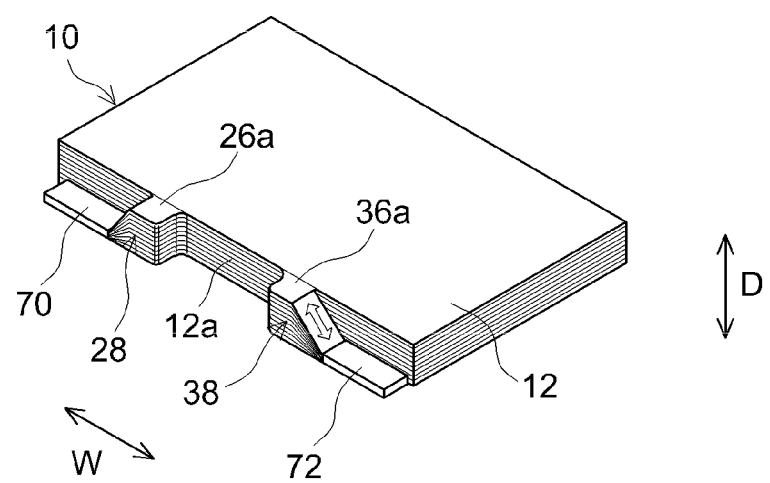
FIG. 5 is a perspective view that schematically illustrates an electrode body after joining current collector terminals.

FIG. 4 is a perspective view that schematically illustrates the electrode body 10 prior to joining the current collector terminals 70 and 72. FIG. 5 is a perspective view that schematically illustrates the electrode body 10 after joining the current collector terminals 70 and 72. As shown in FIG. 4 and FIG. 5, current collecting tabs 26 of the repeatedly laminated plurality of positive electrode sheets 20 are overlaid in the direction of lamination of the electrode body 10 (the thickness direction D in this case) and protrude from an edge 12a of the laminated part 12 (the upper surface 12a in this case (FIG. 1)). By being overlaid in the direction of lamination, the plurality of current collecting tabs 26 constitute a positive electrode side tab group 28. In addition, current collecting tabs 36 of the repeatedly laminated plurality of negative electrode sheets 30 are overlaid in the direction of lamination of the electrode body 10 and protrude from the edge 12a of the laminated part 12. By being overlaid in the direction of lamination, the plurality of current collecting tabs 36 constitute a negative electrode side tab group 38.

The positive electrode side tab group 28 is connected to the positive electrode current collector terminal 70. Specifically, the crossing parts 26b of the current collecting tabs 26 that constitute the positive electrode side tab group 28 are gathered together towards one side in the direction of lamination (the thickness direction D in this case), and the positive electrode current collector terminal 70 is joined (for example, welded) to the position at which the crossing parts are gathered together. According to this configuration the extending parts 26a of the positive electrode side current collecting tabs 26 are not gathered together towards one side in the direction of lamination. As a result, tension (tensile force) applied to the tabs 26 when the crossing parts 26b of the positive electrode side current collecting tabs 26 are gathered together acts only in the direction in which the crossing parts 26b extend from the extending parts 26a (a perpendicular direction) and is unlikely to act on the direction of extension A of the extending parts 26a. By configuring in this way, the occurrence of the positive electrode sheets 20 being pulled in the direction of extension A when the positive electrode side tab group 28 is gathered together (and even the occurrence of the positive electrode sheets 20 protruding in the direction of extension A) is suppressed, and misalignment of the positive electrode sheet 20 can be suppressed. The positive electrode sheet 20 of the electrode body 10 is electrically connected to the positive electrode terminal 80 via the positive electrode current collector terminal 70.

In the same way as on the positive electrode side, the negative electrode current collector terminal 72 is connected to the negative electrode side tab group 38. Specifically, the crossing parts 36b of the current collecting tabs 36 that constitute the negative electrode side tab group 38 are gathered together towards one side in the direction of lamination (the thickness direction D in this case), and the negative electrode current collector terminal 72 is joined (for example, welded) to the position at which the crossing parts are gathered together. According to this configuration the extending parts 36a of the negative electrode side current collecting tabs 36 are not gathered together towards one side in the direction of lamination. As a result, tension (tensile force) applied to the tabs 36 when the crossing parts 36b of the current collecting tabs 36 are gathered together acts only in the direction in which the crossing parts 36b extend from the extending parts 36a (a perpendicular direction) and is unlikely to act on the direction of extension A of the extending parts 36a. By configuring in this way, the occurrence of the negative electrode sheets 30 being pulled in the direction of extension A when the negative electrode side tab group 38 is gathered together (and even the occurrence of the negative electrode sheets 30 protruding in the direction of extension A) is suppressed, and negative electrode sheet 30 misalignment can be suppressed. The negative electrode sheet 30 of the electrode body 10 is electrically connected to the negative electrode terminal 82 via the negative electrode current collector terminal 72.

As explained above, the lithium ion secondary battery 100 includes positive and negative electrodes 20 and 30, which include active material layers 24 and 34 and current collecting tabs 26 and 36, which extend from the active material layers 24 and 34, an electrode body 10, which is constituted by repeatedly and alternately laminating positive and negative electrodes 20 and 30 with a separator 40 interposed therebetween, tab groups 28 and 38, in which same polarity tabs 26 and 36 of the repeatedly laminated positive and negative electrodes 20 and 30 are overlaid in the direction of lamination (that is, tabs of positive electrodes 20 are overlaid on each other and tabs of negative electrodes 30 are overlaid on each other), and current collector terminals 70 and 72, which are connected to the tab groups 28 and 38, as shown in FIG. 1 to FIG. 5. The tab groups 28 and 38 include at least first tabs 26 and 36 as current collecting tabs. The first tabs 26 and 36 have, in a plane that is perpendicular to the direction of lamination, extending parts 26a and 36a which extend from the active material layers 24 and 34, and crossing parts 26b and 36b which extend from the extending parts 26a and 36a in a direction that is perpendicular to the direction of extension of the extending parts 26a and 36a. In addition, the crossing parts 26b and 36b of the first tabs 26 and 36 are gathered together in the direction of lamination, and the current collector terminals 70 and 72 are joined to the positions at which the crossing parts are gathered together.

According to this configuration, tension (tensile force) applied to the first tabs 26 and 36 when the crossing parts 26b and 36b of the first tabs 26 and 36 are gathered together is unlikely to act on the direction of extension A of the first tabs 26 and 36, and the occurrence of positive and negative electrodes 20 and 30 protruding in the direction of extension A of the first tabs 26 and 36 is suppressed. By configuring in this way, misalignment of the electrodes 20 and 30 can be suppressed. In addition, the length of the tabs 26 and 36 in the direction of extension A need not be increased compared to a conventional configuration in which the length of first tabs 26 and 36 in the direction of extension A is increased in order to alleviate tension and suppress misalignment of electrodes 20 and 30. By configuring in this way, it is possible to increase the occupancy of the electrode body 10 (the laminated part 12) in the battery case 50, which contributes to charging and discharging. As a result, it is possible to eliminate space that does not contribute to charging and discharging in the battery case 50 (dead space) and achieve an increase in energy density.

The present invention has been explained in detail above, but the embodiments and working examples mentioned above are merely exemplifications, and the invention disclosed here encompasses modes obtained by variously modifying or altering the specific examples shown above.

For example, the embodiments described above exemplify cases in which the tab groups 28 and 38 are constituted only from first tabs 26 and 36 having extending parts 26a and 36a and crossing parts 26b and 36b, but the present invention is not limited to these cases.

Figure 6:
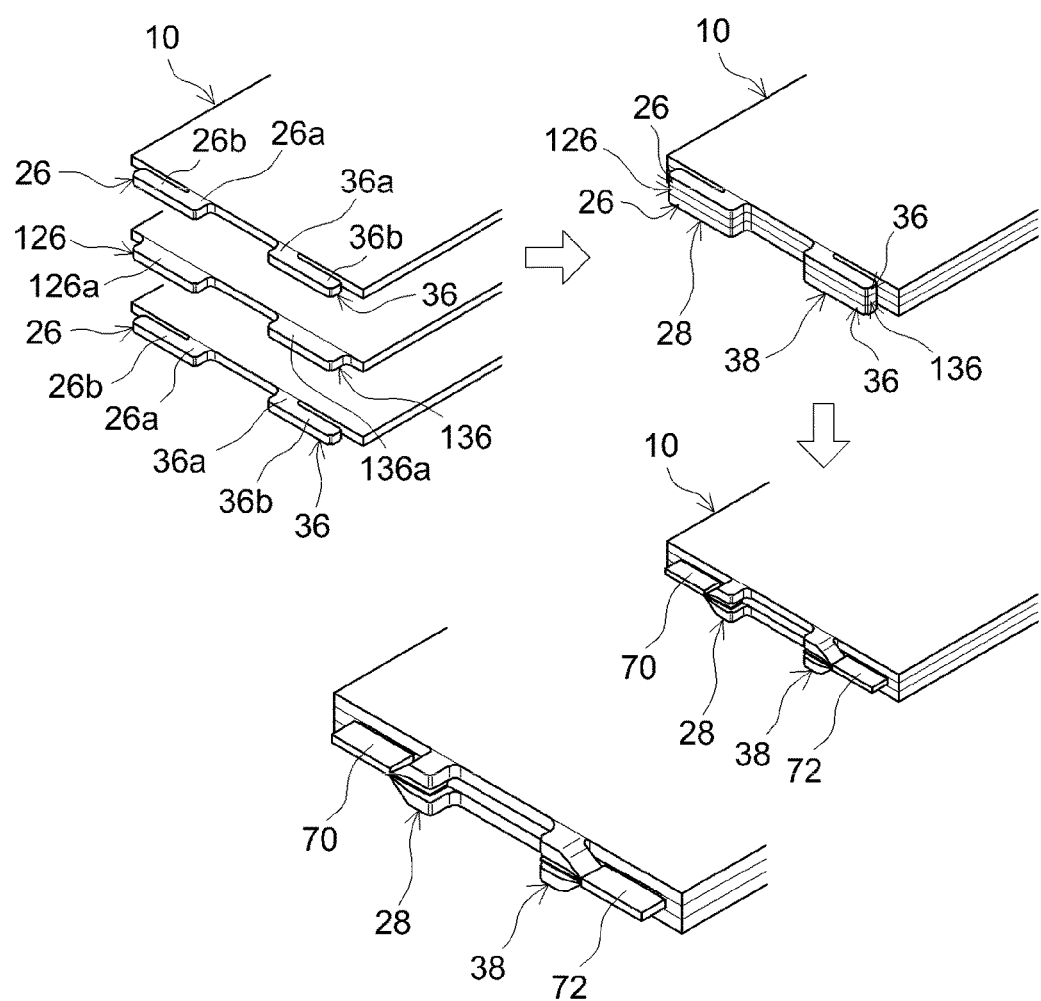
FIG. 6 is a diagram for explaining an electrode body according to another embodiment.

FIG. 6 is a perspective view that schematically illustrates an electrode body 10 and tab groups 28 and 38 according to another embodiment. In this example, the positive electrode side tab group 28 includes first tabs 26, which are disposed on one side and the other side of the electrode body 10 in the direction of lamination, and second tabs 126, which are disposed on the center side in the direction of lamination. The negative electrode side tab group 38 includes first tabs 36, which are disposed on one side and the other side of the electrode body 10 in the direction of lamination, and second tabs 136, which are disposed on the center side in the direction of lamination.

Figure 7:
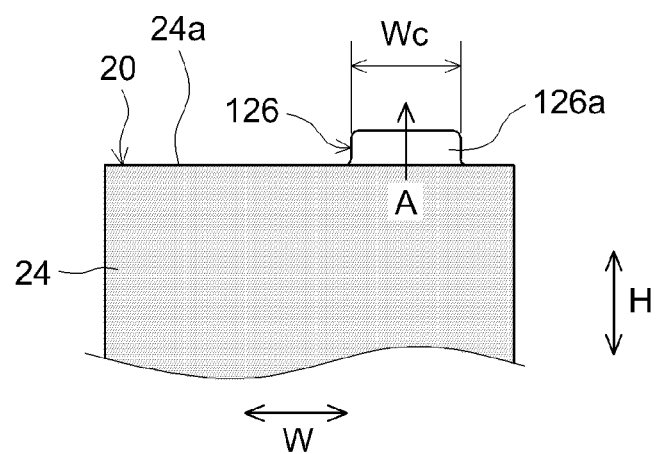
FIG. 7 is a frontal view that schematically illustrates the principal parts of a positive electrode sheet shown in FIG. 6.

FIG. 7 is a frontal view that shows a positive electrode sheet 20 shown in FIG. 6. Each positive electrode side second tab 126 has an extending part 126a, which extends from the positive electrode active material layer 24 in the direction of extension A in a plane that is perpendicular to the direction of lamination. The width Wc of the second tab 126 in a direction that is perpendicular to the direction of extension A (the width direction W in this case) is greater than the width Wa of the extending part 26a of the first tab 26 (FIG. 3). In this embodiment, the width Wc of the extending part 126a of the second tab is the same as the sum of the width Wa of the extending part 26a and the width Wb of the crossing part 26b of the first tab 26 (Wa+Wb: FIG. 3). Like the positive electrode side second tab 126, each negative electrode side second tab 136 has an extending part 136a, which extends from the negative electrode active material layer 34 in the direction of extension A. The configuration of the negative electrode side second tab 136, such as detailed dimensions, is similar to those for the positive electrode side second tab 126, and duplicate explanations are therefore omitted.

In the present embodiment, the positive electrode side and negative electrode side tab groups 28 and 38 are gathered together towards the center side in the direction of lamination of the electrode body 10, as shown in FIG. 6. In this case, tabs on the side (one side and the other side) further from the position at which the tabs are gathered together are subjected to greater tension (tensile force) during gathering than tabs on the side (the center side) nearer to the position at which the tabs are gathered together. First tabs 26 and 36 are used as tabs on the side further from the position at which the tabs are gathered together. Meanwhile, tabs on the side (the center side) nearer to the position at which the tabs are gathered together are subjected to less tension during gathering than tabs on the side (one side and the other side) further from the position at which the tabs are gathered together. Second tabs 126 and 136 are used as tabs on the side nearer to the position at which the tabs are gathered. In addition, the extending parts 126a and 136a of the second tabs 126 and 136 and the crossing parts 26b and 36b of the first tabs 26 and 36 are gathered together towards the center side in the direction of lamination, and the current collector terminals 70 and 72 are joined to the positions at which the tabs are gathered together.

According to this configuration, it is possible to suppress breakage of the tab groups 28 and 38 while effectively suppressing misalignment of the electrodes 20 and 30. That is, because the strength of the first tabs 26 and 36 decreases as a result of the notches in cases where the tab groups 28 and 38 are constituted only from first tabs 26 and 36, there are concerns that the tab groups 28 and 38 will break when an external force such as vibration is applied to the tab groups 28 and 38. Conversely, the second tabs 126 and 136 do not have notches and have extending parts 126a and 136a that are wider than the extending parts 26a and 36a of the first tabs 26 and 36, and are therefore stronger than the first tabs 26 and 36. By using these high strength second tabs 126 and 136 in combination with first tabs 26 and 36, the mechanical strength of the tab groups 28 and 38 is improved, and it is possible to suppress breakage of the tab groups 28 and 38 even if an external force such as vibration is applied to the tab groups 28 and 38. In addition, because the second tabs 126 and 136 are disposed on the side nearer to the position at which the tabs are gathered together (on the center side where less tension is applied when the tabs are gathered together), in cases where the second tabs 126 and 136 are used in combination with the first tabs 26 and 36, electrodes 20 and 30 on the side (the center side) nearer to the position at which the tabs are gathered together are unlikely to be pulled in the direction of extension and an electrode 20 and 30 misalignment suppression effect can be sufficiently achieved.

In the embodiment shown in FIG. 6, the tab groups 28 and 38 are gathered together towards the center side in the direction of lamination of the electrode body 10, but the present invention is not limited to this configuration.

Figure 8:
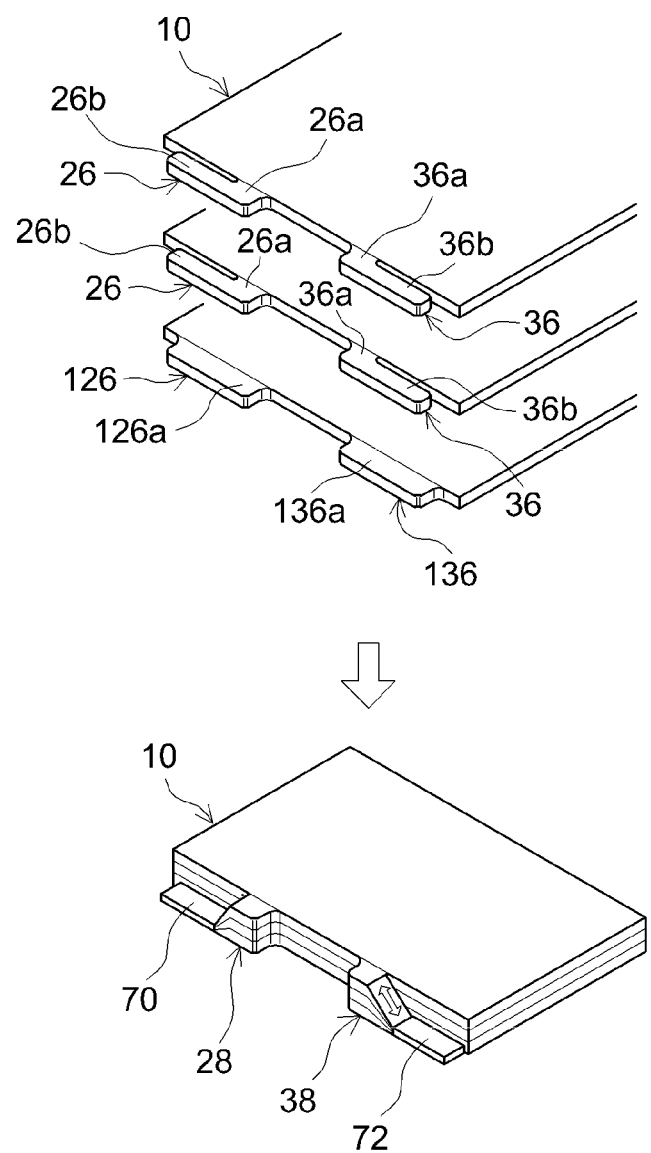
FIG. 8 is a diagram for explaining an electrode body according to another embodiment.

FIG. 8 is a perspective view that schematically illustrates an electrode body 10 and tab groups 28 and 38 according to another embodiment. In this embodiment, the positive electrode side and negative electrode side tab groups 28 and 38 are gathered together towards one side in the direction of lamination of the electrode body 10. In this case, the tab groups 28 and 38 can be configured so that tabs on the side (one side) nearer to the position at which the tabs are gathered together in the direction of lamination are used as the second tabs 126 and 136, and tabs on the side (the center side and the other side) further from the position at which the tabs are gathered together in the direction of lamination are used as the first tabs 26 and 36. By configuring in this way, even if the tab groups 28 and 38 are gathered together towards one side in the direction of lamination of the electrode body 10, by using a combination of second tabs 126 and 136 and first tabs 26 and 36 in an appropriate arrangement, it is possible to suppress breakage of the tab groups 28 and 38 by external forces such as vibration while suppressing electrode misalignment.

In the embodiment shown in FIG. 8, each tab group 28 and 38 is divided into three sections in the direction of lamination, but the number of divisions is not limited thereto. For example, it is possible to divide the tab groups 28 and 38 into two sections in the direction of lamination, and use, as the second tabs 126 and 136, the tabs on one side nearer to the position at which the tabs are gathered together, and use, as the first tabs 26 and 36, the tabs on the other side further from the position at which the tabs are gathered together. The number and placement positions of the first tabs 26 and 36 and second tabs 126 and 136 that constitute the tab groups 28 and 38 may be arbitrarily altered according to need.

The embodiment described above illustrates a case in which the angle formed between the crossing parts 26b and 36b and the direction of extension A of the tabs 26 and 36 is a right angle (90°), but this angle is not limited thereto.

Figure 9:
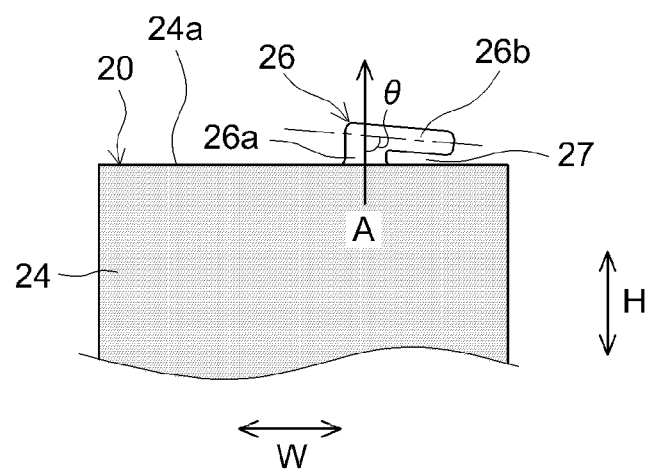
FIG. 9 is a frontal view that schematically illustrates the principal parts of a positive electrode sheet according to another embodiment.

FIG. 9 is a frontal view that schematically illustrates a positive electrode sheet 20 according to another embodiment. In this embodiment, the first tab 26 of the positive electrode sheet 20 has, in a plane that is perpendicular to the direction of lamination, an extending part 26a, which extends from the positive electrode active material layer 24, and a crossing part 26b, which extends from the extending part 26a in a direction that intersects at an acute angle (that is, an angle of less than 90°) with the direction of extension A of the extending part 26a. By configuring in this way, even if the angle θ at which the crossing part 26b intersects with the direction of extension A is an acute angle, it is possible to suppress misalignment of the electrodes 20 and 30 without increasing the length of the tab 26 in the direction of extension A. The angle θ at which the crossing part 26b intersects with the direction of extension A should be 90° or less, for example 60° to 90°, preferably 70° to 90°, and more preferably 80° to 90°.

In the embodiment described above, the positive electrode side tab group 28 and the negative electrode side tab group 38 both protrude from the same surface (the upper surface in this case) 12a of the electrode body 10, but the present invention is not limited to this configuration.

Figure 10:
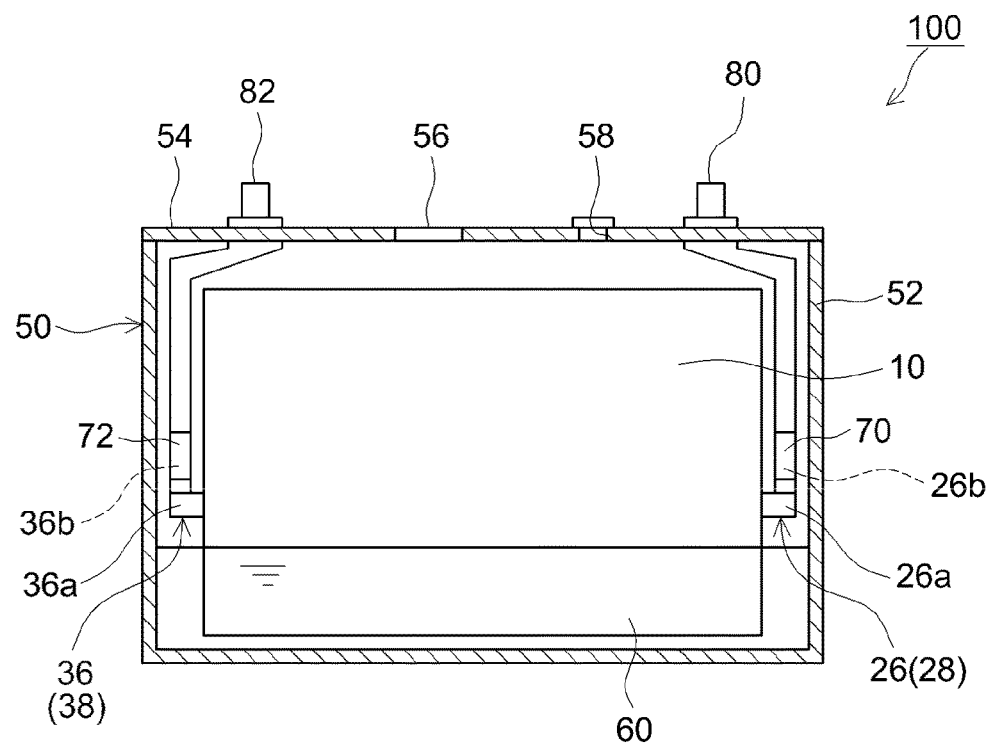
FIG. 10 is a cross sectional view that schematically illustrates a secondary battery according to another embodiment.
Figure 11:
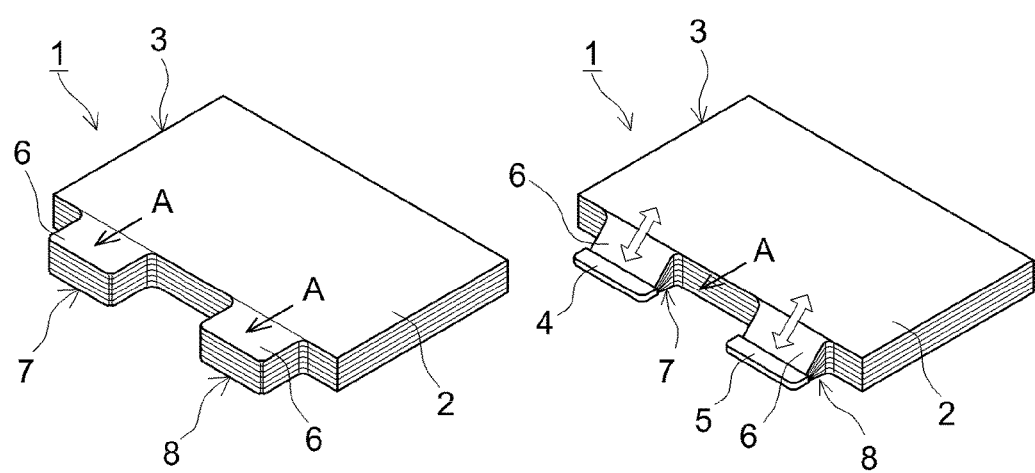
FIG. 11 is a perspective view that schematically illustrates a conventional electrode body.

FIG. 10 is a cross sectional view that schematically illustrates a battery 100 according to another embodiment. In this embodiment, the battery 100 is such that the positive electrode side tab group 28 protrudes towards the right from the right hand surface of the electrode body 10. In addition, the negative electrode side tab group 38 protrudes towards the left from the left hand surface of the electrode body 10. In such cases where the positive electrode side tab group 28 and the negative electrode side tab group 38 protrude from different surfaces of the electrode body 10, misalignment of the positive and negative electrodes 20 and 30 occurs particularly easily when the tab groups 28 and 38 are gathered together. Therefore, the electrode misalignment suppression effect described above can be more effectively achieved.

In addition, preferred applications of the features disclosed here are not limited to the lamination type electrode bodies described above. For example, a preferred application may be a wound electrode body in which the positive electrode current collector 22 and negative electrode current collector 32 are band-shaped sheet materials, the positive electrode current collector 22 and negative electrode current collector 32 are aligned in the longitudinal direction, and the positive electrode active material layer 24 and negative electrode active material layer 34 are disposed so as to face each other, with the separator 40 interposed therebetween, and wound around the winding axis. In this type of wound electrode body, the positive electrode 20 and negative electrode 30 are repeatedly and alternately laminated, with the separator 40 interposed therebetween, in a direction that is perpendicular to the winding axis (the direction of lamination). In this type of wound electrode body, it is possible to form extending parts 26a and 36a and crossing parts 26b and 36b on a positive electrode side current collecting tab 26, which extends from the positive electrode active material layer 24, and a negative electrode side current collecting tab 36, which extends from the negative electrode active material layer 34. The advantageous effect mentioned above can also be achieved in such cases.

The battery 100 can be used in a variety of applications, but is characterized by having a high energy density and being unlikely to suffer from electrode misalignment. Therefore, by utilizing these characteristics, the battery 100 can be advantageously used in large batteries having high energy densities in particular. Specifically, the battery 100 can be advantageously used in large capacity type batteries having theoretical capacities of, for example, 10 Ah or more (for example, 10 to 250 Ah), for example, 50 Ah or more, or 100 Ah or more (for example, 100 to 200 Ah). In addition, the battery 100 can be advantageously used as, for example, a power source for a motor fitted to a vehicle (a motive power source). The type of vehicle is not particularly limited, but typical examples thereof include plug-in hybrid vehicles (PHV), hybrid vehicles (HV) and electric vehicles (EV).

What is claimed is:

1. A battery comprising:
   positive and negative electrodes each provided with an active material layer and a current collecting tab that extends from an edge line of the active material layer in a direction perpendicular to the edge line;
   an electrode body constituted by repeatedly and alternately laminating the positive and negative electrodes in the direction of lamination with a separator interposed therebetween;
   tab groups obtained by overlaying, in the direction of lamination, same polarity tabs of the repeatedly laminated positive and negative electrodes; and
   current collector terminals connected to the tab groups, wherein
   the tab groups include, as the current collecting tabs, second tabs disposed on a center side of the tab groups in the direction of lamination and first tabs disposed on both outer sides of the tab groups in the direction of lamination,
   the first tabs each have an extending part which extends from the edge line of the active material layer in a direction perpendicular to the edge line, and a crossing part which extends from the extending part in a width direction parallel to the edge line of the active material layer, or in a direction intersecting with the width direction and toward the edge line of the active material layer, a width (Wc) of the second tabs in the width direction is greater than a width (Wb) of the crossing part of the first tabs in the width direction, and the second tabs and the crossing parts of the first tabs are gathered together towards the center side in the direction of lamination, and the current collector terminals are joined to the positions at which the tabs are gathered together.

2. A battery comprising:

positive and negative electrodes each provided with an active material layer and a current collecting tab that extends from an edge line of the active material layer in a direction perpendicular to the edge line;

an electrode body constituted by repeatedly and alternately laminating the positive and negative electrodes in the direction of lamination with a separator interposed therebetween;

tab groups obtained by overlaying, in the direction of lamination, same polarity tabs of the repeatedly laminated positive and negative electrodes; and current collector terminals connected to the tab groups, wherein the tab groups include, as the current collecting tabs, second tabs disposed only on one outer side of the tab groups in the direction of lamination, and first tabs disposed on a center side and another outer side of the tab groups in the direction of lamination, the first tabs each have an extending part which extends from the edge line of the active material layer in a direction perpendicular to the edge line, and a crossing part which extends from the extending part in a width direction parallel to the edge line of the active material layer, or in a direction intersecting with the width direction and toward the edge line of the active material layer, and wherein a width (Wc) of the second tabs in the width direction is greater than a width (Wb) of the crossing part of the first tabs in the width direction, and the second tabs and the crossing parts of the first tabs are gathered together towards the one outer side in the direction of lamination, and the current collector terminals are joined to the positions at which the tabs are gathered together.

3. The battery according to claim 1, wherein the crossing part of each of the first tabs extends from the extending part in the width direction parallel to the edge line of the active material layer, or in the direction intersecting with the width direction and toward the edge line of the active material layer, when the first tabs are in an un-bent state.

4. The battery according to claim 2, wherein the crossing part of each of the first tabs extends from the extending part in the width direction parallel to the edge line of the active material layer, or in the direction intersecting with the width direction and toward the edge line of the active material layer, when the first tabs are in an un-bent state.

* * * * *